(12) United States Patent
Jimenez (10) Patent No.: US 6,971,872 B1
(45) Date of Patent: Dec. 6, 2005

(54) PIPE HEATING APPARATUS

(76) Inventor: Robert J. Jimenez, 4508 Wawona St., Los Angeles, CA (US) 90065

( * ) Notice: Subject to any disclaimer, the term of this patent is extended or adjusted under 35 U.S.C. 154(b) by 0 days.

(21) Appl. No.: 10/719,241

(22) Filed: Nov. 21, 2003

(51) Int. Cl.[7] .............................................. F24J 3/00
(52) U.S. Cl. ...................................... 432/225; 432/231
(58) Field of Search ............................... 432/224, 225, 432/226, 222, 231; 219/521, 390

(56) References Cited

U.S. PATENT DOCUMENTS

| | | | |
|---|---|---|---|
| 4,437,453 A | | 3/1984 | Temple et al. |
| 5,853,289 A | * | 12/1998 | Todd et al. ................... 432/225 |
| 6,033,213 A | * | 3/2000 | Halvorsen, Jr. ............. 432/225 |
| 6,257,880 B1 | * | 7/2001 | Hirayama ................... 432/225 |
| 6,561,797 B1 | * | 5/2003 | Johnson ...................... 432/225 |

* cited by examiner

Primary Examiner—Gregory Wilson (57) ABSTRACT

A pipe heating apparatus for heating pvc pipe to facilitate bending. The pipe heating apparatus includes a housing having a lower portion and an upper portion, and at least one aperture extending through a wall of the housing. The lower portion includes a bottom wall for resting upon a horizontal support surface, and a lower perimeter wall extending upwardly from the bottom wall. Similarly, the upper portion includes an top wall and a upper perimeter wall extending downwardly from the top wall. The lower perimeter wall and the upper perimeter wall both have the same form and size. The upper portion may be positioned to rest upon the lower portion. Thus, an edge of the upper perimeter wall abuts an edge of the lower perimeter wall. The housing defines an interior space for receiving a portion of a pvc pipe.

19 Claims, 5 Drawing Sheets

PIPE HEATING APPARATUS

BACKGROUND OF THE INVENTION

1. Field of the Invention

The present invention relates to hot boxes and more particularly pertains to a new pipe heating apparatus for heating PVC pipe to facilitate bending.

2. Description of the Prior Art

The use of hot boxes is known in the prior art. Illustrative examples of such devices include U.S. Pat. No. 4,437,453; U.S. Pat. No. 6,033,213; and U.S. Pat. No. 6,257,880.

While these devices fulfill their respective, particular objectives and requirements, the need remains for an apparatus, which is easily portable to and from the job site.

SUMMARY OF THE INVENTION

To this end, the present invention generally comprises a housing having a lower portion and an upper portion, and at least one aperture extending through a wall of the housing. The lower portion includes a bottom wall for resting upon a horizontal support surface, and a lower perimeter wall extending upwardly from the bottom wall. Similarly, the upper portion includes a top wall and a upper perimeter wall extending downwardly from the top wall. The lower perimeter wall and the upper perimeter wall both have the same form and size. The upper portion may be positioned to rest upon the lower portion. Thus, an edge of the upper perimeter wall abuts an edge of the lower perimeter wall. The housing defines an interior space for receiving a portion of a pvc pipe.

Polyvinyl chloride (PVC) thermoplastic is a polymer of vinyl chloride which is hard and rigid and used extensively as an electrical insulator, or conduit, for wires and cables. PVC is also widely used for various types of plumbing applications, primarily as drain pipes, as usage is restricted to certain applications by building codes in many areas. One of the more difficult and time consuming tasks associated with using PVC pipes is bending the pipe to the required shape and contour prior to installation. To accomplish this, heat is applied, normally using a heat gun or a blow torch. A lot of time can be expended to heat the PVC sufficiently to achieve the degree of malleability necessary to bend the pipe. This task is even more time consuming when the ambient temperature is cold.

The Pipe heating apparatus would be rectangular, aluminum box and would have overall dimensions of 8 inches in height, 16 inches in width, and 8 inches in depth. The Pipe heating apparatus is comprised of an upper and lower section which are hinge connected together on one side. A circular opening, with a diameter of 2 inches, is featured at the center of the top panel of the upper section. This opening would function as an insertion hole in which the nozzle of a heat gun would be inserted. To facilitate equal distribution of the heat generated by the heat gun, two metal plates are attached to the underside of the top panel, immediately below the heat gun insertion opening. The two metal plates extend downward at an approximate 45 degree angle from the underside, one plate angled toward the left side of the interior area and the second plated angled toward the right side of the interior area. The lower section affords a smaller, circular opening (1 inch diameter) on one end which would be used for the insertion of a blow torch nozzle. A metal, mesh plate is integrally attached to the top of the lower section which would facilitate the even distribution of the heat produced by a blow torch throughout the interior area.

In addition to the heat source openings, the upper and lower sections feature a semicircular opening at each end which, when the top lid is closed, are mutually aligned to form a circular opening which has a diameter of 1¼inch. The diameter of the openings would enable the Pipe heating apparatus to accommodate ½ inch to 1 inch PVC pipes which would be horizontally positioned across the width of the box. A plastic covered handle is attached to the exterior top side of the upper section, centrally positioned, which would be used for conveniently carrying the box.

Whenever the Pipe heating apparatus is to be used for heating and bending a pipe, the top section would be opened, the pipe nestled into the semicircular openings on the lower section, and the top section closed again. The heat source of choice, a heat gun or blow torch, would then be inserted into the opening to supply heat to the interior area. The pipe could be easily rotated to expedite the even transfer of heat to PVC material until the required degree of malleability to bend the pipe had been achieved. The Pipe heating apparatus is an innovative an practical device that would make the task of bending PVC pipes much easier and less time consuming, benefits that could be fully appreciated by various types tradesmen, do-it-yourselfers, and others.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
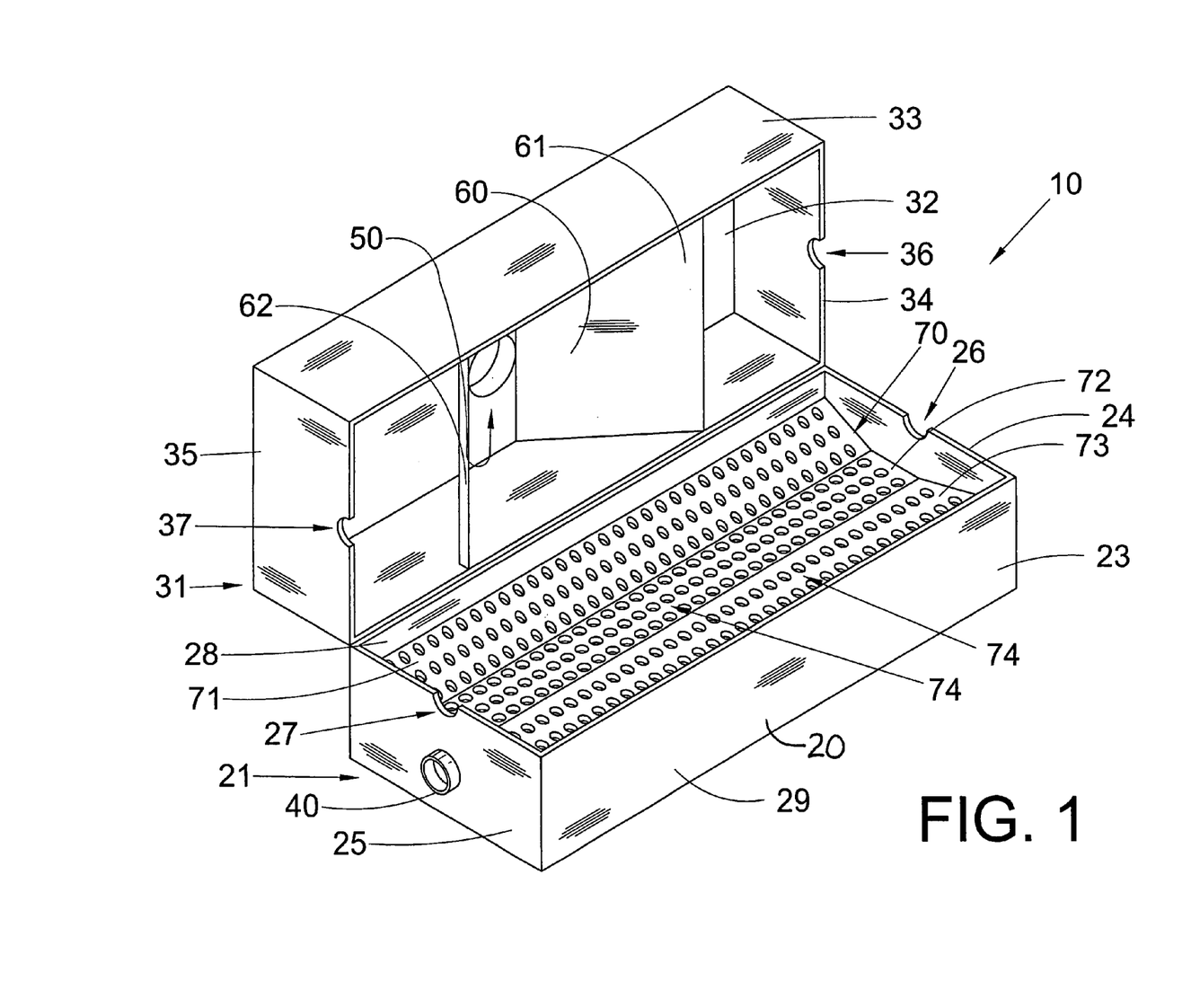
FIG. 1 is a schematic perspective view of a new pipe heating apparatus according to the present invention.
Figure 2:
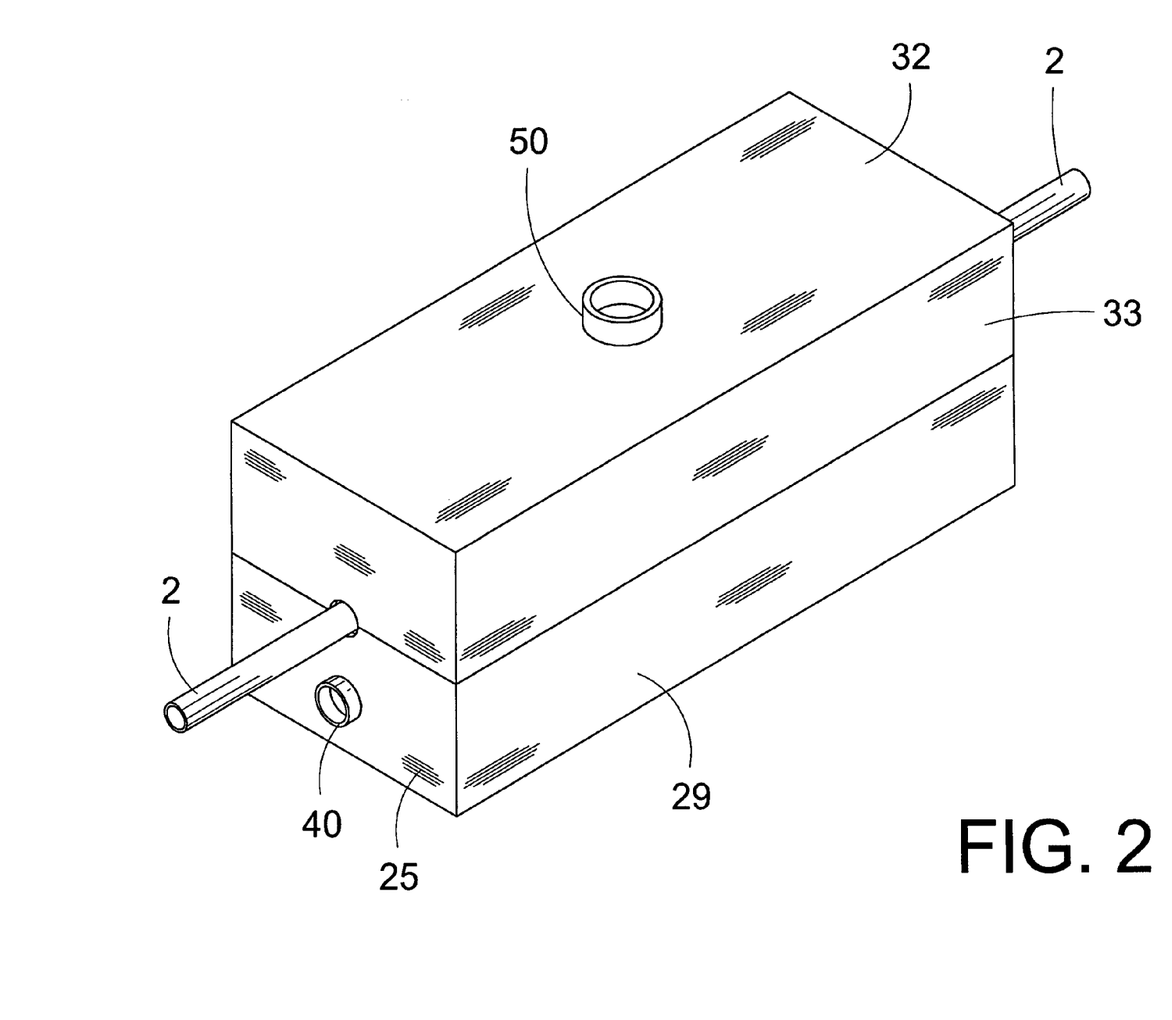
FIG. 2 is a schematic perspective view of the present invention in the closed position.
Figure 3:
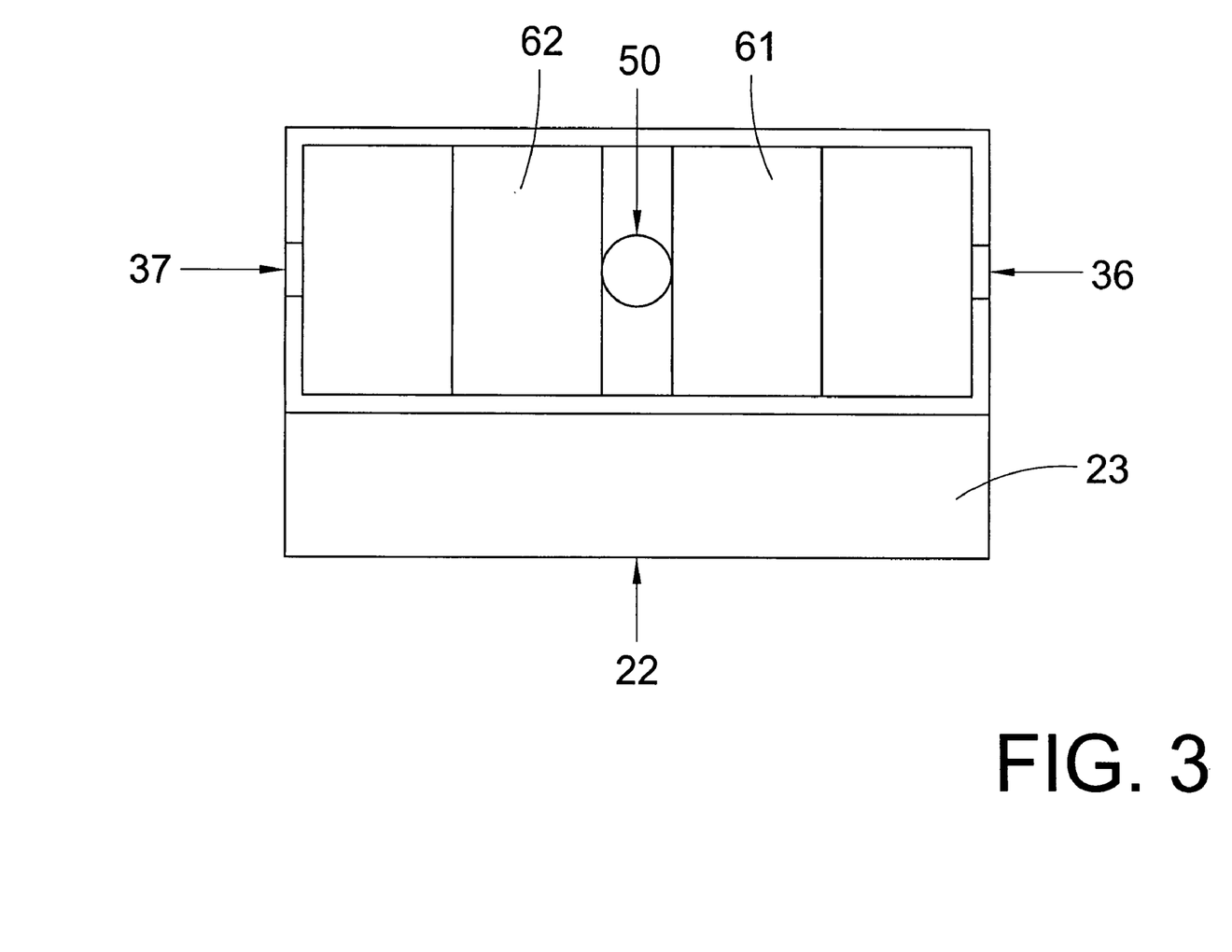
FIG. 3 is a schematic front view of the present invention.
Figure 4:
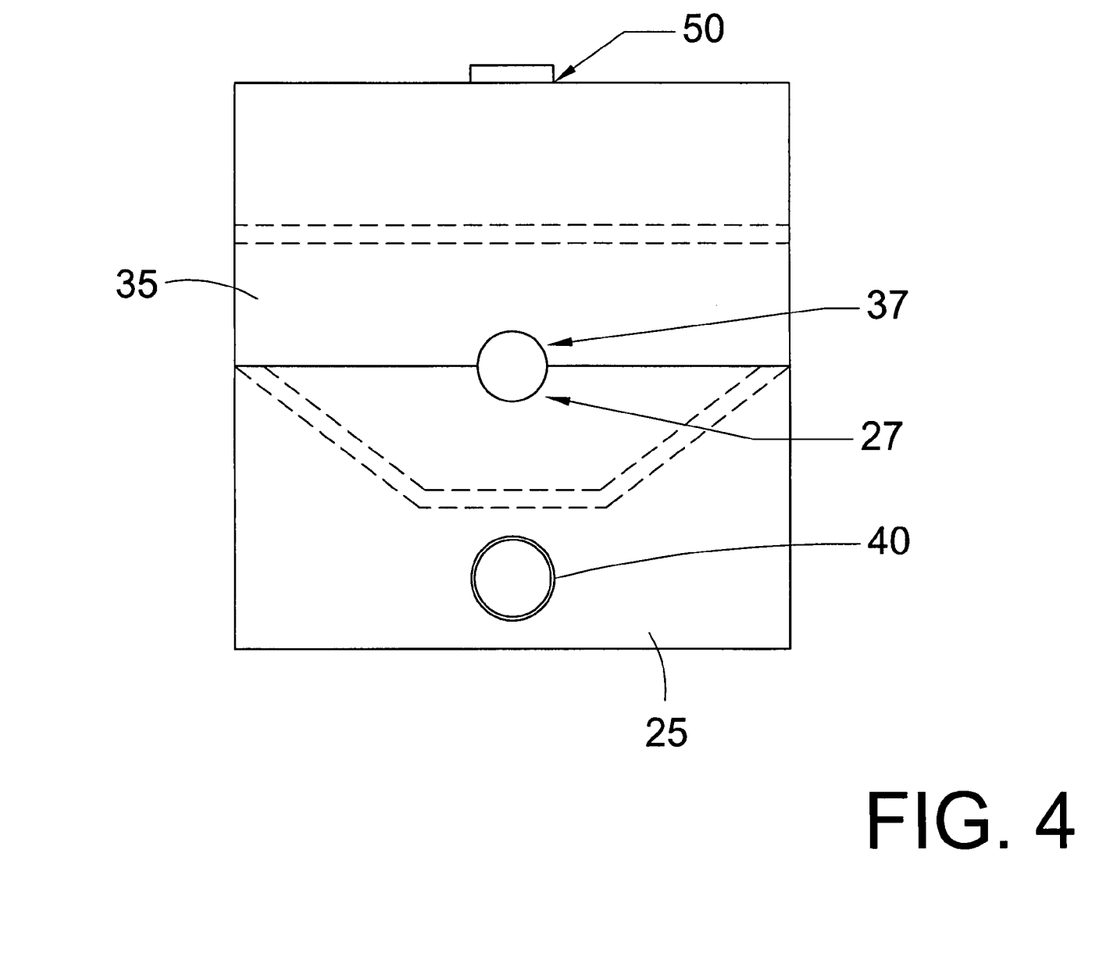
FIG. 4 is a schematic side view of the present invention.
Figure 5:
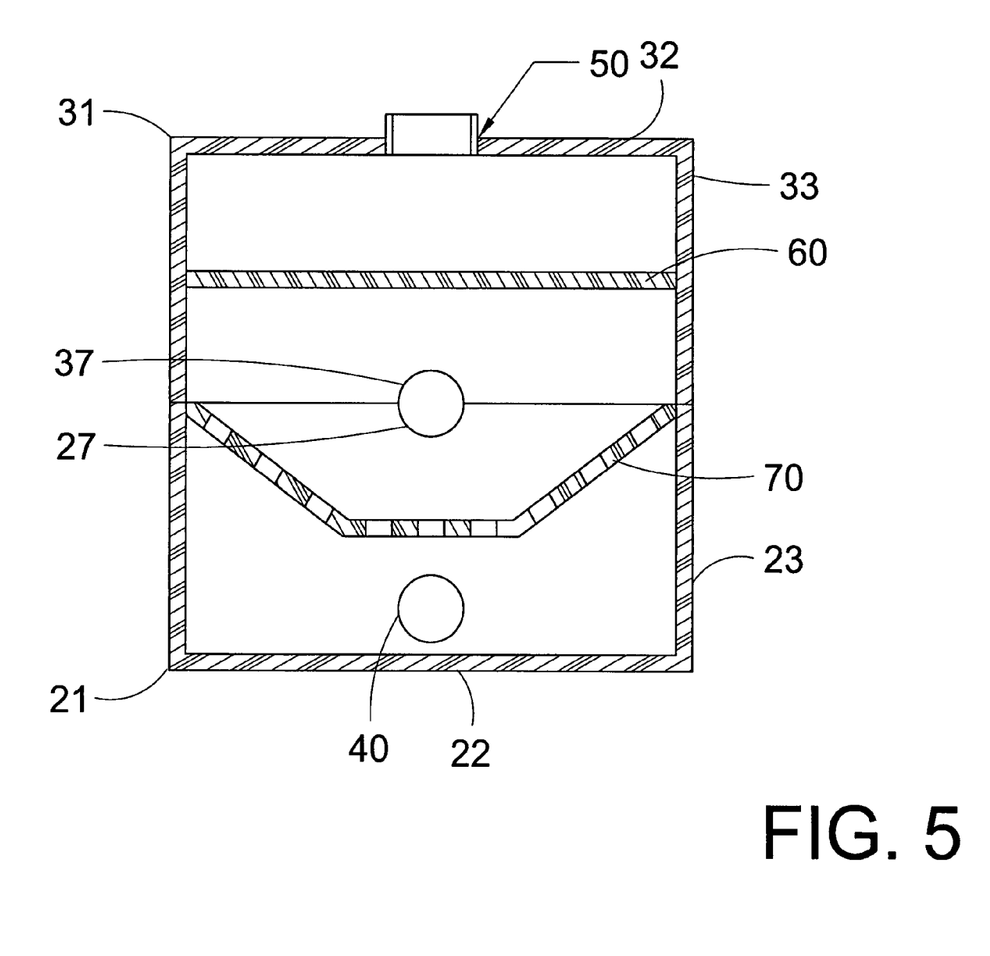
FIG. 5 is a schematic cross-sectional view of the present invention.

With reference now to the drawings, and in particular to FIGS. 1 through 6 thereof, a new pipe heating apparatus embodying the principles and concepts of the present invention and generally designated by the reference numeral 10 will be described.

As best illustrated in FIGS. 1 through 6, the pipe heating apparatus 10 generally comprises a housing 20 having a lower portion 21 and an upper portion 31, and at least one aperture 40 extending through a wall of the housing 20.

The lower portion 21 includes a bottom wall 22 for resting upon a horizontal support surface, and a lower perimeter wall 23 extending upwardly from the bottom wall 22. Similarly, the upper portion 31 includes an top wall 32 and a upper perimeter wall 33 extending downwardly from the top wall 32. The lower perimeter wall 23 and the upper perimeter wall 33 both have the same form and size. The upper portion 31 may be positioned to rest upon the lower portion 21. Thus, an edge of the upper perimeter wall 33 abuts an edge of the lower perimeter wall 23. The housing 20 defines an interior space for receiving a portion of a pvc pipe 2.

The aperture 40 is positioned within the housing 20 for selectively receiving a heat source 4. Preferably the aperture 40 is positioned through the lower perimeter wall 23. The aperture 40 has a diameter of approximately ¾ of an inch for selectively receiving a portable torch as a source of heat for heating the portion of pvc pipe 2 received in the interior space.

Most preferably, a top aperture 50 is also positioned through the top wall 32. The top aperture 50 has a diameter of approximately two inches for selectively receiving a nozzle of a heat gun & as a source of heat for heating the portion of pvc pipe 2 received in the interior space.

The upper portion 31 may be hingably coupled to the lower portion 21 to facilitate insertion and removal of the portion of pvc pipe 2 received in the interior portion.

Preferably, four notches are positioned through the perimeter walls 23, 33 of the housing 20. A first notch 36 is positioned along a medial portion of a lower edge of a first side 34 of the upper perimeter wall 33. A second notch 26 is positioned along a medial portion of an upped edge of a first side 24 of the lower perimeter wall 23. The second notch 26 is aligned with the first notch 36 when the upper portion 31 is positioned on top of the lower portion 21. A third notch 37 is positioned along a medial portion of a lower edge of a second side 35 of the upper perimeter wall 33. A fourth notch 27 is positioned along a medial portion of an upped edge of a second side 25 of the lower perimeter wall 23. The fourth notch 27 is aligned with the third notch 37 when the upper portion 31 is positioned on top of the lower portion 21. The first 36, second 26, third 37, and fourth notches 27 facilitate positioning a portion of pvc pipe 2 within the interior space when the pvc pipe 2 has a length greater than a length of the housing 20.

In an embodiment the first 36 and second notches 26 form an opening having a diameter of approximately one and one half inches when the first 36 and second notches 26 are aligned. Similarly, the third 37 and fourth notches 27 form an opening also having a diameter of approximately one and one half inches when the third 37 and fourth notches 47 are aligned.

An upper heat deflector assembly 60 includes a first portion 61 positioned adjacent a first side of the top aperture 50, and a second portion 62 positioned adjacent a second side of the top aperture 50. The first 61 and second portions 62 facilitate heat flow away from the top aperture 50 into the interior space.

In an embodiment the first 61 and second portions 62 of the upper heat deflector assembly 60 have a perpendicular relationship with a longitudinal axis of the upper portion 31 of the housing 20.

In a further embodiment the first 61 and second portions 62 of the upper heat deflector assembly 60 are positioned such that the first 61 and second portions 62 angle downwardly into the interior space as they extend away from the top aperture 50.

A lower heat deflector assembly 70 may be positioned within the lower portion 21 above the aperture 40. The lower heat assembly 70 extends along a length of the lower portion 21. The lower deflector assembly 70 facilitates heat flow away from the aperture 40 within the interior space.

In an embodiment the lower heat deflector assembly 70 further comprises a first extent 71, a second extent 72, and a third extent 73. The first extent 71 is positioned along a third side 28 of the lower portion 21, and extends along a length of the lower portion 21. The second extent 72 is operationally coupled to the first extent 71. The second extent 72 also extends along a length of the lower portion 21. The second extent 72 has a spaced substantially parallel relationship with the bottom wall 22. The third extent 73 is operationally coupled to the second extent 72. The third extent 72 extends along a length of the lower portion 21. The third extent 72 is positioned adjacent to a fourth side 29 of the lower portion 21 opposite the third side 28 of the lower portion 21. The first 71, second 72, and third extents 73 when combined extend along a width of the lower portion 21.

In a further embodiment the first extent 71 has an angular relationship to the second extent 72 such that the first extent 71 extends upwardly as the first extent 71 extends away from the second extent 72; and the third extent 73 also has an angular relationship to the second extent 72 such that the third extent 73 also extends upwardly as the third extent 73 extends away from the second extent 72.

In a still a further embodiment the lower heat deflector assembly 70 has a plurality of apertures 74 dispersed in an array along a length and width of the lower heat deflector assembly 70 to facilitate heat transfer from the portable torch 6 when positioned in the aperture 40.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pipe heating apparatus for use in heating PVC pipe and conduit for bending, the apparatus comprising:

a housing having a lower portion and an upper portion, said lower portion having an bottom wall for resting upon a horizontal support surface, said lower portion having a lower perimeter wall extending upwardly from said bottom wall, said upper portion having an top wall and a upper perimeter wall extending downwardly from said top wall, said lower perimeter wall and said upper perimeter wall having the same form and size, said upper portion being positionable to rest upon said lower portion whereby an edge of said upper perimeter wall abuts an edge of said lower perimeter wall, said housing defining an interior space for receiving a portion of a pvc pipe;

an aperture positioned within said housing for selectively receiving a heat source; and an upper heat deflector assembly being positioned in said upper portion of said housing, said upper heat deflector assembly having a first portion positioned at an angle to said top wall, said upper heat deflector assembly having a second portion positioned at an angle to said top wall, said first and second portions facilitating heat flow away from said top wall and into said interior space.

2. The apparatus of claim 1, wherein said aperture is positioned through said lower perimeter wall.

3. The apparatus of claim 2, wherein said aperture having a diameter of approximately ¾ of an inch for selectively receiving a portable torch as a source of heat for heating the portion of pvc pipe received in said interior space.

4. The apparatus of claim 1, wherein said aperture is positioned through said top wall.

5. The apparatus of claim 4, wherein said aperture having a diameter of approximately two inches for selectively receiving a nozzle of a heat gun as a source of heat for heating the portion of pvc pipe received in said interior space.

6. The apparatus of claim 1, further comprising:
said aperture is positioned through said lower perimeter wall, said aperture having a diameter of approximately ¾ of an inch for selectively receiving a portable torch as a source of heat for heating the portion of pvc pipe received in said interior space; and
a top aperture being positioned through said top wall, said top aperture having a diameter of approximately two inches for selectively receiving a nozzle of a heat gun as a source of heat for heating the portion of pvc pipe received in said interior space.

7. The apparatus of claim 1, wherein said upper portion being hingably coupled to said lower portion to facilitate insertion and removal of the portion of pvc pipe received in said interior portion.

8. A pipe heating apparatus for use in heating PVC pipe and conduit for bending, the apparatus comprising:
a housing having a lower portion and an upper portion, said lower portion having an bottom wall for resting upon a horizontal support surface, said lower portion having a lower perimeter wall extending upwardly from said bottom wall, said upper portion having an top wall and a upper perimeter wall extending downwardly from said top wall, said lower perimeter wall and said upper perimeter wall having the same form and size, said upper portion being positionable to rest upon said lower portion whereby an edge of said upper perimeter wall abuts an edge of said lower perimeter wall, said housing defining an interior space for receiving a portion of a pvc pipe;
an aperture positioned within said housing for selectively receiving a heat source, said aperture is positioned through said lower perimeter wall, said aperture having a diameter of approximately ¾ of an inch for selectively receiving a portable torch as a source of heat for heating the portion of pvc pipe received in said interior space;
a top aperture being positioned through said top wall, said top aperture having a diameter of approximately two inches for selectively receiving a nozzle of a heat gun as a source of heat for heating the portion of pvc pipe received in said interior space;
said upper portion being hingably coupled to said lower portion to facilitate insertion and removal of the portion of pvc pipe received in said interior portion; and
an upper heat deflector assembly, said upper heat deflector assembly having a first portion positioned adjacent a first side of said top aperture, said upper heat deflector assembly having a second portion positioned adjacent a second side of said top aperture, said first and second portions facilitating heat flow away from said ton aperture into said interior space.

9. The apparatus of claim 8, further comprising:
a first notch positioned along a medial portion of a lower edge of a first side of said upper perimeter wall;
a second notch positioned along a medial portion of an upped edge of a first side of said lower perimeter wall, said second notch being aligned with said first notch when said upper portion is positioned on top of said lower portion;
a third notch positioned along a medial portion of a lower edge of a second side of said upper perimeter wall;
a fourth notch positioned along a medial portion of an upped edge of a second side of said lower perimeter wall, said fourth notch being aligned with said third notch when said upper portion is positioned on top of said lower portion;
said first, second, third, and fourth notches facilitating positioning a portion of pvc pipe within said interior space when the pvc pipe has a length greater than a length of said housing.

10. The apparatus of claim 9, wherein said first and second notches form an opening having a diameter of approximately one and one half inches when said first and second notches are aligned; and said third and fourth notches form an opening having a diameter of approximately one and one half inches when said third and fourth notches are aligned.

11. The apparatus of claim 8, further comprising:
wherein said first and second portions of said upper heat deflector assembly each having a longitudinal axis, said first and second portioned being positioned such that said longitudinal axis has a perpendicular relationship with a longitudinal axis of said upper portion of said housing; and
wherein said first and second portions of said upper heat deflector assembly being positioned such that said first and second portions angle downwardly into said interior space as they extend away from said top aperture.

12. The apparatus of claim 8, further comprising a lower heat deflector assembly positioned within said lower portion above said aperture, said lower heat assembly extending along a length of said lower portion, said lower deflector assembly facilitating heat flow away from said aperture within said interior space.

13. The apparatus of claim 12, further comprising:
wherein said lower heat deflector assembly further comprises a first extent, a second extent, and a third extent;
said first extent being positioned along a third side of said lower portion, said first extent extending along a length of said lower portion;
said second extent being operationally coupled to said first extent, said second extent extending along a length of said lower portion, said second extent having a top surface defining a plane said second extent being positioned such that said plane has a spaced substantially parallel relationship with a plane defined by said bottom wall; and
said third extent being operationally coupled to said second extent, said third extent extending along a length of said lower portion, said third extent being positioned adjacent to a fourth side of said lower portion opposite said third side of said lower portion;
said first, second, and third extent extending along a width of said lower portion.

14. The apparatus of claim 13, wherein said first extent has an angular relationship to said second extent such that said first extent extends upwardly as said first extent extends away from said second extent, and said third extent has an angular relationship to said second extent such that said third extent extends upwardly as said third extent extends away from said second extent.

15. The apparatus of claim 12, wherein said lower heat deflector apparatus further comprises a plurality of apertures dispersed in an array along a length and width of said lower heat deflector apparatus to facilitate heat transfer from the portable torch when positioned in said aperture.

16. The apparatus of claim 8, further comprising:
a first notch positioned along a medial portion of a lower edge of a first side of said upper perimeter wall;
a second notch positioned along a medial portion of an upped edge of a first side of said lower perimeter wall, said second notch being aligned with said first notch when said upper portion is positioned on top of said lower portion;
a third notch positioned along a medial portion of a lower edge of a second side of said upper perimeter wall;
a fourth notch positioned along a medial portion of an upped edge of a second side of said lower perimeter wall, said fourth notch being aligned with said third notch when said upper portion is positioned on top of said lower portion;
said first, second, third, and fourth notches facilitating positioning a portion of pvc pipe within said interior space when the pvc pipe has a length greater than a length of said housing;
wherein said first and second notches form an opening having a diameter of approximately one and one half inches when said first and second notches are aligned, and said third and fourth notches form an opening having a diameter of approximately one and one half inches when said third and fourth notches are aligned;
wherein said first and second portions of said upper heat deflector assembly each having a longitudinal axis, said first and second portioned being positioned such that said longitudinal axis has a perpendicular relationship with a longitudinal axis of said upper portion of said housing;
wherein said first and second portions of said upper heat deflector assembly being positioned such that said first and second portions angle downwardly into said interior space as they extend away from said top aperture;
a lower heat deflector assembly positioned within said lower portion above said aperture, said lower heat assembly extending along a length of said lower portion, said lower deflector assembly facilitating heat flow away from said aperture within said interior space;
wherein said lower heat deflector assembly further comprises a first extent, a second extent, and a third extent, said first extent being positioned along a third side of said lower portion, said first extent extending along a length of said lower portion, said second extent being operationally coupled to said first extent, said second extent extending along a length of said lower portion, said second extent having a top surface defining a plane said second extent being positioned such that said plane has a spaced substantially parallel relationship with a plane defined by said bottom wall, said third extent being operationally coupled to said second extent, said third extent extending along a length of said lower portion, said third extent being positioned adjacent to a fourth side of said lower portion opposite said third side of said lower portion;
said first, second, and third extent extending along a width of said lower portion;
wherein said first extent has an angular relationship to said second extent such that said first extent extends upwardly as said first extent extends away from said second extent, and said third extent has an angular relationship to said second extent such that said third extent extends upwardly as said third extent extends away from said second extent; and
wherein said lower heat deflector apparatus further comprises a plurality of apertures dispersed in an array along a length and width of said lower heat deflector apparatus to facilitate heat transfer from the portable torch when positioned in said aperture.

17. A pipe heating apparatus for use in heating PVC pipe and conduit for bending, the apparatus comprising:
a housing having a lower portion and an upper portion, said lower portion having an bottom wall for resting upon a horizontal support surface, said lower portion having a lower perimeter wall extending upwardly from said bottom wall, said upper portion having an top wall and a upper perimeter wall extending downwardly from said top wall, said lower perimeter wall and said upper perimeter wall having the same form and size, said upper portion being positionable to rest upon said lower portion whereby an edge of said upper perimeter wall abuts an edge of said lower perimeter wall, said housing defining an interior space for receiving a portion of a pvc pipe;
an aperture positioned within said housing for selectively receiving a heat source, said aperture is positioned through said lower perimeter wall, said aperture having a diameter of approximately ¾ of an inch for selectively receiving a portable torch as a source of heat for heating the portion of pvc pipe received in said interior space;
a top aperture being positioned through said top wall, said top aperture having a diameter of approximately two inches for selectively receiving a nozzle of a heat gun as a source of heat for heating the portion of pvc pipe received in said interior space;
said upper portion being hingably coupled to said lower portion to facilitate insertion and removal of the portion of pvc pipe received in said interior portion;
a lower heat deflector assembly positioned within said lower portion above said aperture, said lower heat assembly extending along a length of said lower portion, said lower deflector assembly facilitating heat flow away from said aperture within said interior space; and
wherein said lower heat deflector apparatus further comprises a plurality of apertures dispersed in an array along a length and width of said lower heat deflector apparatus to facilitate heat transfer from the portable torch when positioned in said aperture.

18. The apparatus of claim 17, further comprising:
wherein said lower heat deflector assembly further comprises a first extent, a second extent, and a third extent;
said first extent being positioned along a third side of said lower portion, said first extent extending along a length of said lower portion;
said second extent being operationally coupled to said first extent, said second extent extending along a length of said lower portion, said second extent having a top surface defining a plane said second extent being positioned such that said plane has a spaced substantially parallel relationship with a plane defined by said bottom wall; and said third extent being operationally coupled to said second extent, said third extent extending along a length of said lower portion, said third extent being positioned adjacent to a fourth side of said lower portion opposite said third side of said lower portion;

said first, second, and third extent extending along a width of said lower portion.

19. The apparatus of claim 18, wherein said first extent has an angular relationship to said second extent such that said first extent extends upwardly as said first extent extends away from said second extent, and said third extent has an angular relationship to said second extent such that said third extent extends upwardly as said third extent extends away from said second extent.

* * * * *